United States Patent [19]

Lippmann et al.

[11] 3,861,208
[45] Jan. 21, 1975

[54] TIRE TESTING MACHINE

[75] Inventors: Seymour A. Lippmann, Huntington Woods; Harold L. Stiller, Grosse Pointe Park, both of Mich.

[73] Assignee: Uniroyal Inc., New York, N.Y.

[22] Filed: Dec. 12, 1973

[21] Appl. No.: 424,124

[52] U.S. Cl. .................................... 73/146
[51] Int. Cl. .......................... G01n 17/02
[58] Field of Search ................... 73/146, 8

[56] References Cited
UNITED STATES PATENTS
3,019,642   2/1962   Gallagher .......................... 73/146
3,604,245   9/1971   Atelian .............................. 73/8

*Primary Examiner*—Donald O. Woodiel
*Attorney, Agent, or Firm*—Philip Sands, Esq.

[57] ABSTRACT

Apparatus for effecting measurement of forces exerted by a pneumatic tire against a surface along which the tire is rolled, specifically at an interface between the tire and surface, the apparatus including an elongate bed upon which a carriage is shiftably supported. The carriage is adapted to carry an inflated tire sample in rolling contact with the bed. An assembly is provided and forms part of the bed for measuring forces exerted by the tire as the latter rolls thereover. The foregoing abstract is neither intended to define the invention disclosed in the specification, nor is it intended to limit the scope of the invention in any way.

25 Claims, 6 Drawing Figures

TIRE TESTING MACHINE

BACKGROUND OF THE INVENTION

The present invention relates generally to a machine, assembly or apparatus for testing pneumatic tires, and more particularly to apparatus for effecting measurement of the distribution of forces exerted by a pneumatic tire against a surface along which the tire is rolled, specifically at an interface between the tire and surface.

Many important characteristics of pneumatic tires are intimately related to the distribution of forces exerted by a tire in rolling contact with the road, namely those forces which are developed at the interface between the rolling tire and road. In the past, such a distribution of forces at the road-tread interface has been determined utilizing measurements effected under static as well as dynamic conditions. Testing of tires under dynamic conditions has generally been achieved by rotating a tire in rolling contact with a rotatable drum, the forces not necessarily being measured at the road-tread interface.

However, because of the nature of the devices used for such purposes, the measurement of forces, even when at the road-tread interface, has been limited to a determination of regional (length and breadth of the interface) "averages" of the forces from which there is absent detailed or "microscopic" force data which play an important role in the analysis of the overall regional or interfacial force average. Thus, merely arriving at force distributions which result from measured force averages are not entirely accurate, and do not adequately reflect the characteristics of a rolling tire for further pneumatic tire design.

Another disadvantage attributable to conventional tire testing devices, is that such devices do not effectively generate data relating to conditions of tire acceleration and skidding. The operability of such conventional devices is generally limited to simulating "normal" or non-skid and non-accelerating vehicular travel. Such acceleration and skidding data is often vital for designing effective and safe pneumatic tires.

SUMMARY OF THE INVENTION

Accordingly, it is an object of the present invention to provide apparatus for effecting the measurement of forces exerted by a pneumatic tire against a surface along which the tire is rolled, specifically at an interface between the tire and surface.

It is another object of the present invention to provide such apparatus for determining a distribution of forces between a rolling tire and a surface upon which the tire is rolled, both "macroscopically" (regionally) and "microscopically" (in detail).

It is still a further object of the present invention to provide such apparatus which will measure the distribution of forces exerted at the interface between a tire and surface upon which the tire is rolled under conditions of acceleration and skidding of the rolling tire, and likewise under conditions of non-skidding and constant speed of the rolling tire.

In accordance with the above objects and others as will become apparent upon further reading of the specification hereinbelow, the present invention pursuant to a preferred embodiment thereof, comprises an elongate bed upon which a carriage is shiftably supported. The carriage is adapted to secure a tire in rolling contact with the bed, and when shifted along the bed will cause the tire to roll over a load-sensing assembly which is adapted to measure forces exerted by the tire thereagainst and, thereby, against the bed. The load-sensing assembly includes a pair of load-sensing units, at least one of which is adjustably supported for movement laterally of the bed for permitting microscopic "mapping" of the entire tread-bed interface after a number of successive tire passes.

BRIEF DESCRIPTION OF THE DRAWINGS

While the specification concludes with claims particularly pointing out and distinctly claiming the subject matter regarded as this invention, it is believed that the invention will be better understood from the following description, taken in conjunction with the accompanying drawings, in which:

DETAILED DESCRIPTION OF THE INVENTION

Figure 1:
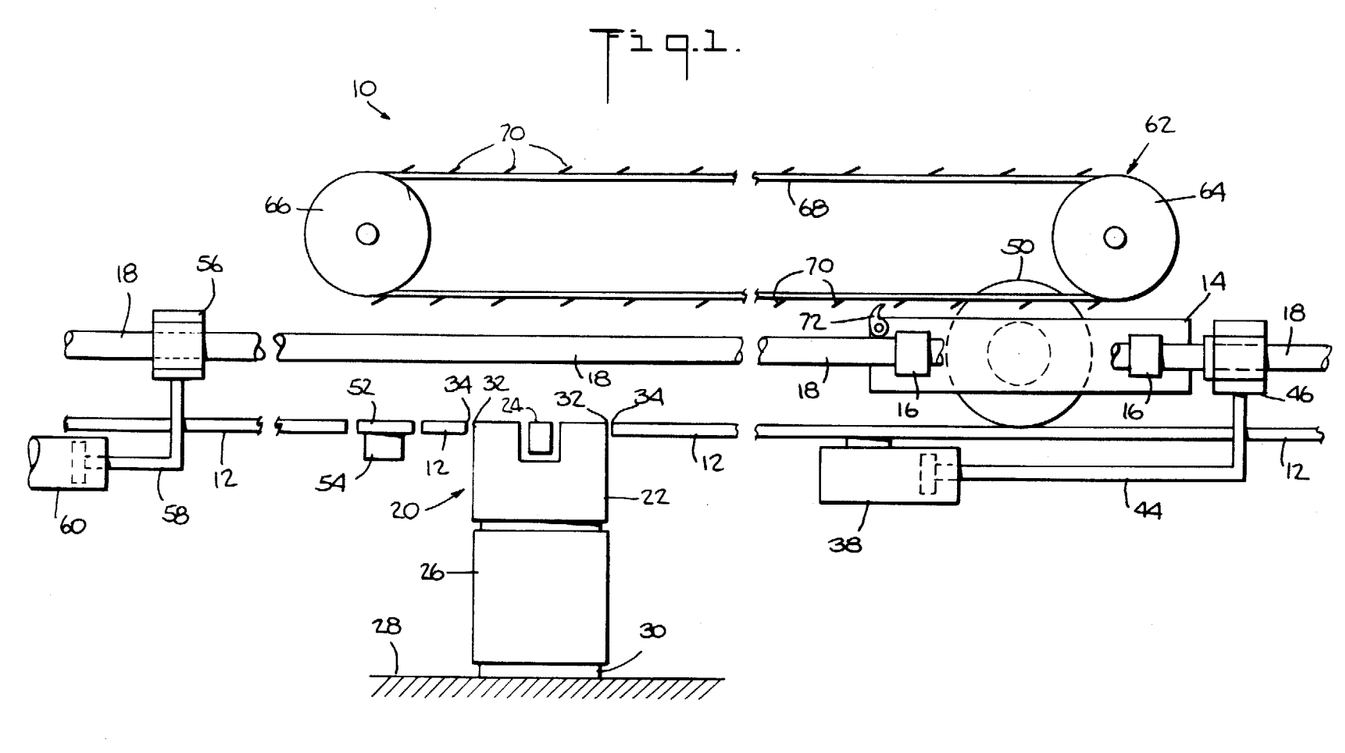
FIG. 1 is a schematic, fragmentary, elevational view of the apparatus pursuant to the present invention.
Figure 2:
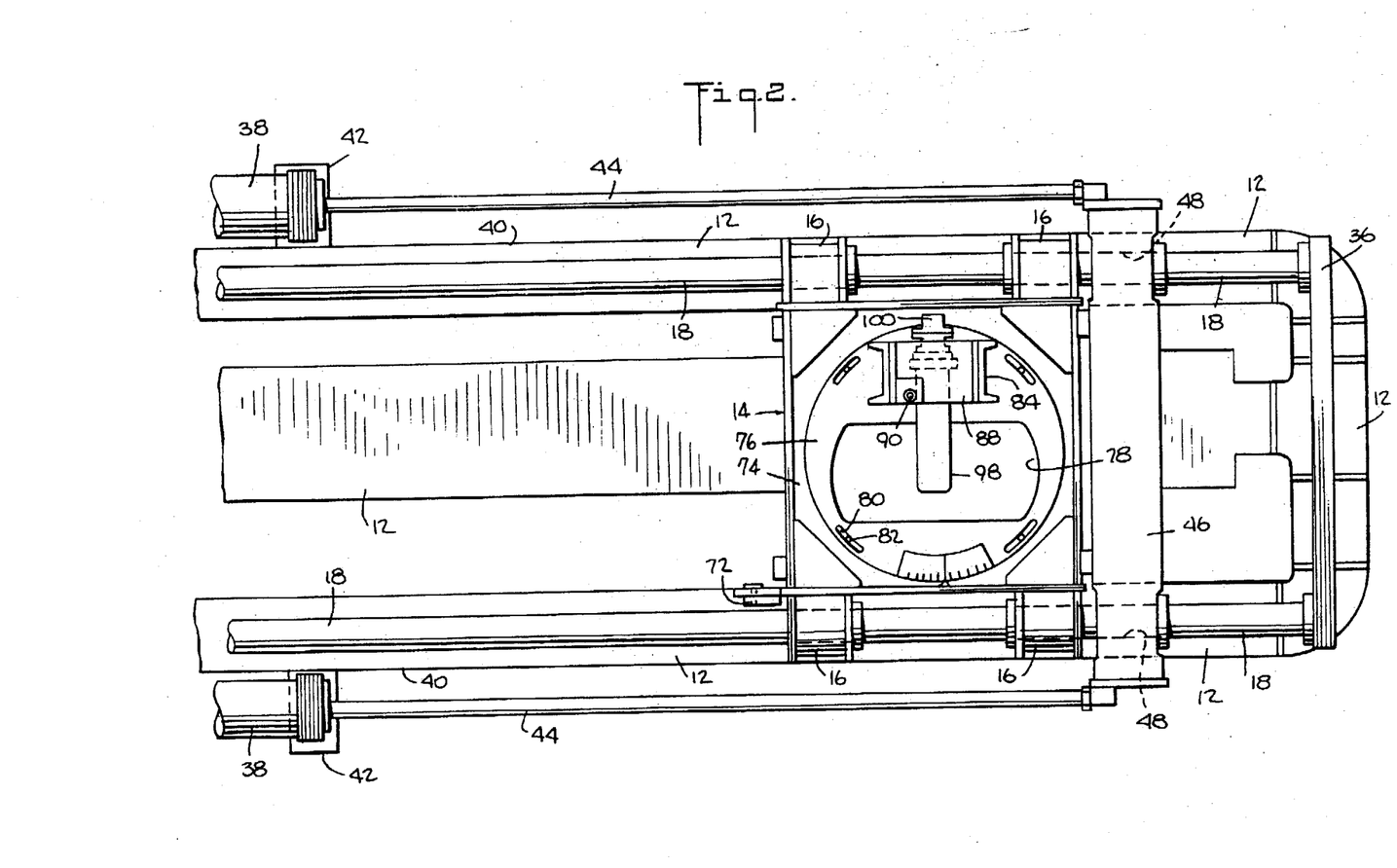
FIG. 2 is a fragmentary plan view of a portion of the apparatus illustrated in FIG. 1.

Referring now to the drawings, and more particularly to FIGS. 1 and 2, there is illustrated apparatus generally denoted by the reference character 10 for effecting measurement of forces exerted by a pneumatic tire against a surface along which the tire is rolled. The apparatus 10 includes a flat bed 12 along which a tire-supporting carriage 14 is displaceable. The carriage 14 is in the form of a generally rectangular frame and includes two pairs of sleeve-like bushings 16 which surround and are slidingly associated with a pair of raised elongate rods 18 which are spaced from one another laterally of the bed 12 and extend in parallel relation longitudinally of the bed 12.

Generally forming part of the bed 12, is a load-sensing assembly 20 comprising a stationary load-sensing unit 22 upon which is arranged, and relative to which is adjustable, a movable load-sensing unit 24. The load-sensing assembly 20 is mounted upon a steel block which weighs approximately 6,000 pounds, the latter resting upon, but being isolated from, a flooring 28 through the intermediary of an appropriate elastomeric shock-absorbing pad 30. The load-sensing assembly 20 is provided with a pair of edges 32 which extend laterally of the bed 12 and which are spaced slightly from a pair of corresponding laterally extending edges 34 of the bed 12 by, preferably, approximately 0.01 inch. Thus, the provision of the pad-supported, heavy weighted, steel block 26 upon which rests the load-sensing assembly 20, and the spacing of the lateral edges 32 of the assembly 20 from the lateral edges 34 of the bed 12, serves to effectively insulate the assembly 20 from vibrations of the bed 12 and the flooring 28 during displacement of the carriage 14.

The carriage 14 may be initially displaced relative to the rods 18, which are affixed in a raised position to the bed 12 by a pair of brackets 36 (only one shown in FIG. 2), by means of a pair of power cylinders or jacks 38. The jacks 38 are affixed respectively to the longitudinally extending outer edges 40 of the bed 12 through the intermediary of respective brackets 42. The jacks 38 are provided with retractable, protractable, piston rods 44 respectively which are at their respective free ends affixed to a yoke 46. The yoke 46 extends laterally across the bed 12 and is provided with a pair of spaced bores 48 which surround the rods 18 respectively and permit sliding of the yoke 46 along the rods 18. The yoke 46 is engageable with the right side of the carriage 14 when the piston rods 44 are retracted. The yoke 46 will remain in engagement with the carriage 14 during the retraction of the piston rods 44 and will, thereby, accelerate or catapult the latter. At the end of the retracting stroke of the piston rods 44, displacement of the yoke 46 will terminate. However, the carriage 14 will release itself from the yoke 46 and will continue to accelerate relative to the bed 12 along the rods 18.

During the course of displacement of the carriage 14, a tire 50 mounted on the carriage 14 will roll in contact with the bed 12, and eventually reach and roll over upon the load-sensing assembly 20 which will in turn effect measurement of the loads exerted by the tire 50 thereagainst. Because of the inertia of the carriage 14, the latter will continue to slide along the rods 18 beyond the load-sensing assembly 20 and pass over a substantially transparent plate 52 beneath which is mounted conventional photographic equipment 54 for photographing the distortion of the tire 50 at the interface between the tread of the tire 50 and the transparent plate 52.

Displacement of the carriage 14 may be arrested by means of an abutment-acting yoke 56 which is similar to the yoke 46 and is slidingly mounted upon the rods 18 for limited displacement relative to the latter when engaged by the carriage 14. The yoke 56 is connected to the free end of each of a pair of piston rods 58 (only one of which is shown in FIG. 1) which are in turn operatively associated with respective power cylinders or jacks 60 (only one of which is shown in FIG. 1). The jacks 60 and their corresponding piston rods 58 cushion and absorb the shock transmitted to the yoke 56 when the latter is engaged by the carriage 14. It will be understood, although not fully illustrated, that the operative association of the yoke 56 with that of the pair of piston rods 58 and the pair of jacks 60 is akin to the operative association of the yoke 46 with that of the piston rods 44 and jacks 38 illustrated in FIG. 2.

Displacement of the carriage 14 relative to the bed 12 may be effected, likewise, in a condition of constant speed, as opposed to a condition of acceleration, by means of a belt-and-pulley assembly denoted generally by the reference character 62. The assembly 62 includes a driver pulley 64 and a driven pulley 66 (FIG. 1) with which cooperates an endless belt 68 in the form of a chain or the like, or in the form of a band upon which there are provided laterally extending, inclined, spaced ribs 70. The driver pulley 64 is rotated by conventional means, such as a motor or the like, at a constant rotary speed and, thereby, effects a closed-path displacement of the belt 68 and rotation of the driven pulley 66. The belt-and-pulley assembly 62 is adapted to cooperate with the catapulting assembly of the jacks 38, the piston rods 44 and the yoke 46, to effect displacement of the carriage 14 along the bed 12 at a constant speed.

In this respect, the yoke 46 when shifted to the left in FIG. 1, via the piston rods 44 and the jacks 38, will accelerate the carriage 14 toward the load-sensing assembly 20. However, prior to reaching the latter assembly, because of friction and the rolling resistance of the tire acting over the distance between the assembly 20 and the yoke 46, which distance is approximately, preferably, in the range of 25-35 feet, the carriage 14 will begin to decelerate and slow down to a speed corresponding to the closed-path movement of the belt 68. When the speed of the carriage 14 corresponds with the speed of the belt 68, a pawl 72 detachably mounted upon the carriage 14 will engage and lock with one of the ribs 70 formed on the belt 68, thereby clamping the carriage 14 to the moving belt 68.

The pawl 72 is pivotally connected to the leading end of the carriage 14 and is spring-loaded in a counterclockwise direction upwardly so as to assume a vertical orientation corresponding to that illustrated in FIG. 1. An appropriate abutment (not shown) limits the extent of counterclockwise displacement of the pawl 72 so that it will not pivot beyond that vertical orientation thereof as illustrated in FIG. 1. During the initial course of acceleration of the carriage 14 relative to the moving belt 68, the speed of the carriage 14 is initially greater than that of the speed of the belt 68 and, thus, the pawl 72 will successively contact a number of the ribs 70 prior to being clamped by one of the ribs 70.

Thus, the spring-loaded pawl 72 will intermittently pivot in a direction clockwise as it successively engages the ribs 70 during the period in which the speed of the carriage 14 is greater than the speed of the moving belt 68. However, due to the orientation and configuration of the pawl 72, and the respective ribs 70 of the belt 68, when the speed of the carriage 14 coincides with that of the belt 68, an appropriate rib 70 will engage and clamp the pawl 72 to the belt 68 causing the carriage 14 to continue to move at a speed corresponding to the speed of the belt 68. The carriage 14 will, thereby, be caused to pass over the load-sensing assembly 20 at a constant speed permitting the latter assembly to measure the interfacial forces exerted by the tire 50 thereagainst.

When the pawl 72 reaches the pulley 66, the rib 70 with which the pawl 72 is engaged, will rotate upwardly relative to the periphery of the pulley 66 and release the pawl 72. Once the pawl 72 has been released, the carriage 14 will continue to move relative to the bed 12, because of the inertia of the carriage 14, until it is arrested by the yoke 56 at the left end of the bed 12. Thus, the load-sensing assembly 20 may effect measurement of the interfacial forces between itself and the tread of the tire 50 either at a varying or a constant speed.

Figure 3:
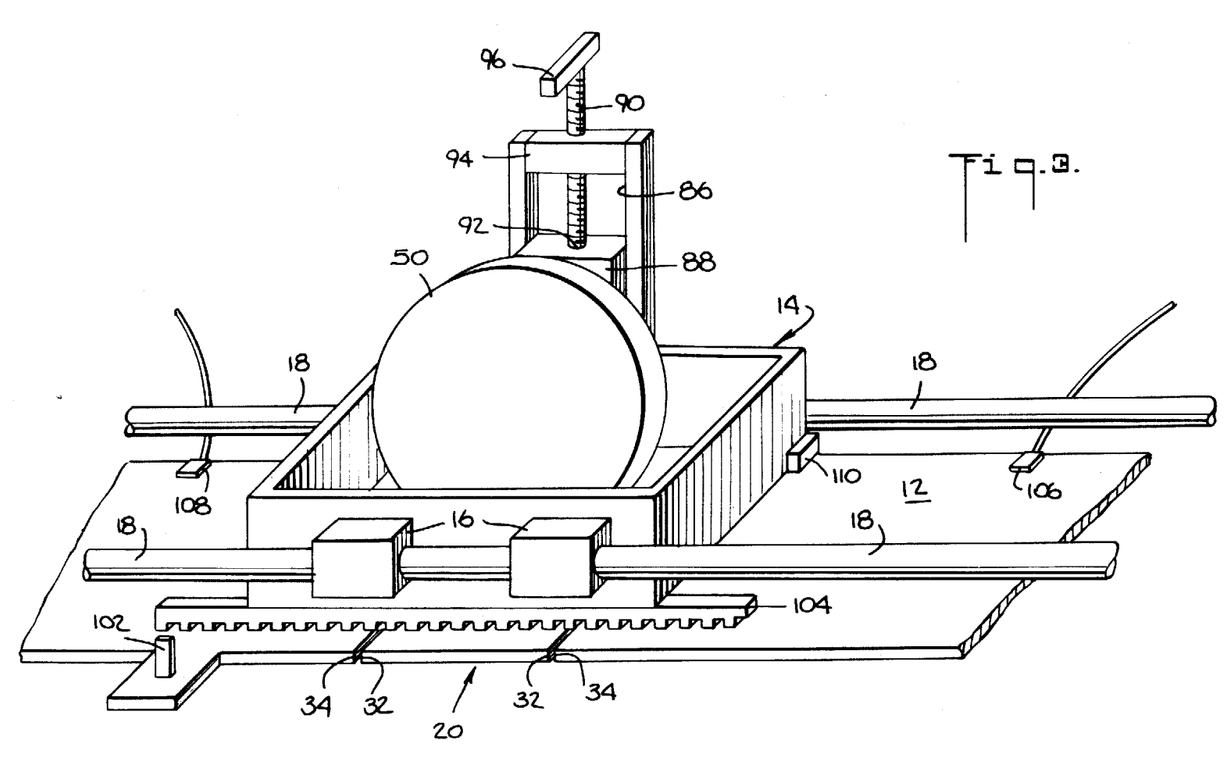
FIG. 3 is a schematic, fragmentary, perspective view, on enlarged scale, illustrating the tire-mounting carriage and its slidable association with a road-simulating bed.

Referring now to FIGS. 2 and 3, the carriage 14, which is in the form of a rectangular frame, includes a base plate 74 which rotatably supports an adjustable swivel plate 76 having a substantially circular configuration and an eccentrically disposed cutout 78. The swivel plate 76 is provided with four arcuate slots 80 into which freely project respective pins 82 which extend vertically from and are affixed to the base plate 74. The swivel plate 76 may, thus, be turned relative to the base plate 74 so that the major axis of the cut-out 78 may be oriented relative to the bed 12 in any of a number of selected positions. The pins 82 may be threaded for association with respective internally threaded nuts (not shown) to effect locking of the swivel plate 76 in a selected position.

Affixed to the swivel plate 76 and extending upwardly therefrom, is a bracket 84 in which is defined a vertically directed passageway 86. Disposed within the passageway 86 is a block 88 whose elevation relative to the swivel plate 76 may be adjusted by means of a threaded shaft 90. The shaft 90 has a free end 92 which is affixed and rotatable relative to the block 88, and an intermediary portion which is threadedly seated in a correspondingly threaded aperture formed in an upper cross-bar 94 of the bracket 84. Rotation of the threaded shaft 90 may be effected such as by means of a handle or wrench 96 which is detachably associated with the threaded shaft 90.

Rotatably journalled in the block 88 is an axle 98 which, in cantilevered fashion, projects axially in a direction laterally of the bed 12, and is disposed above the cut-out 78 formed in the swivel plate 76. The axle 98, via conventional clamping means (not shown) is adapted to support the tire 50 such that the latter projects through the cut-out 78 in the swivel plate 76, and likewise through an appropriate opening (not shown) in the base plate 74 into rolling contact with the bed 12. An appropriate motor 100 of hydraulic, pneumatic or electrical nature, may be operatively associated with the axle 98, via a conventional clutch, for either selectively driving the axle 98, or for selectively inhibiting rotation of the latter (the latter in a manner akin to a brake).

Accordingly, the tire 50, depending upon its size, may be vertically adjusted into rolling contact with the bed 12, via the vertically adjustable block 88, and may be oriented relative to the bed 12 such that its median equatorial plane is directed either parallel to the longitudinal axis of the bed 12, or is alternatively inclined slightly relative to the latter when the swivel plate 76 is turned slightly relative to the base plate 74. Moreover, the tire 50 may be placed into a condition wherein it rotates freely upon the bed 12 when the motor 100 is disengaged therefrom, to simulate normal straight driving, and alternatively into a condition wherein its rotation relative to the bed 12 is retarded or assisted by the motor 100 to simulate tire skidding. It will be understood, that whatever condition the tire 50 is in as it rotates relative to the bed 12, such condition will be sensed by the load-sensing assembly 20 when the tire 50 rolls thereover.

Associated with the load-sensing assembly 20 and disposed, preferably, downstream of the latter, is a proximity-sensing device 102 which acts to detect the specific location of the interface between the tire 50 and the load-sensing assembly 20. The proximity-sensing device 102, preferably magnetically, cooperates with a, preferably metallic, rack 104 affixed to the underside of the carriage 14 and having teeth confronting the device 102. As each successive tooth of the rack 104 passes over the device 102, the device 102 via conventional electrical means transmits a pulse to a conventional digital counter and computer assembly (not shown). The latter assembly stores the intelligence transmitted thereto so that as the interfacial force location is altered on successive passes of the tire 50 over the load-sensing unit 22, the measured forces may be appropriately correlated with the exact position that the forces were measured.

The proximity-sensing device 102 is operatively associated with a pair of conventional, preferably magnetically actuated, switches 106 and 108 affixed to the bed 12. The switch 106 is upstream of the load-sensing assembly 20 and when triggered operates to electrically couple the proximity-sensing device 102 with the aforementioned digital counter and computer assembly. On the other hand, the switch 108 when triggered operates to electrically uncouple the proximity-sensing device 102 from the digital counter and computer assembly. Triggering of the switches 106 and 108 is effected, preferably, by means of a magnetic element 110 affixed to the trailing end of the carriage 14 at a position upon the latter so as to pass over in close vertical proximity, the switches 106 and 108. The switches 106 and 108 are preferably conventional magnetically triggered switches, for example of the type known as "Hall effect" switches. The switches 106 and 108 are in a conventional manner electrically coupled with the proximity-sensing device 102 and, thus, the coupling association of the switches 106 and 108 with the device 102 is omitted from the drawings for clarity.

Figure 4:
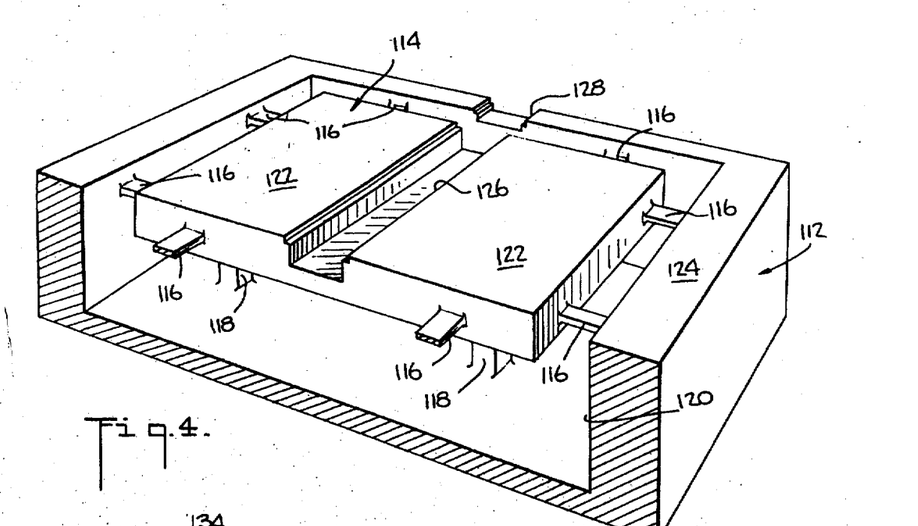
FIG. 4 is a fragmentary, perspective view of the macroscopic load-sensing unit pursuant to the present invention.
Figure 5:
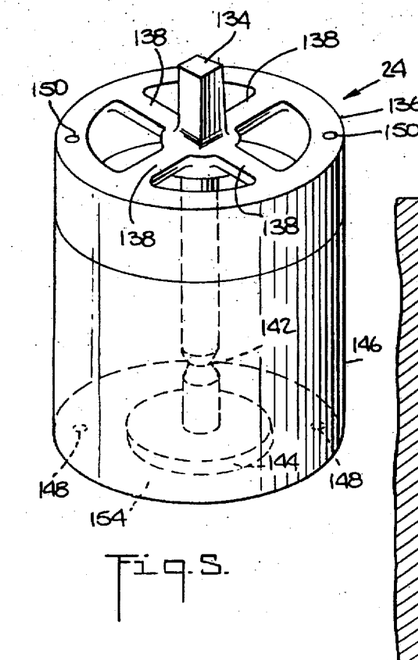
FIG. 5 is a view similar to FIG. 4, but illustrating the microscopic load-sensing unit pursuant to the present invention.
Figure 6:
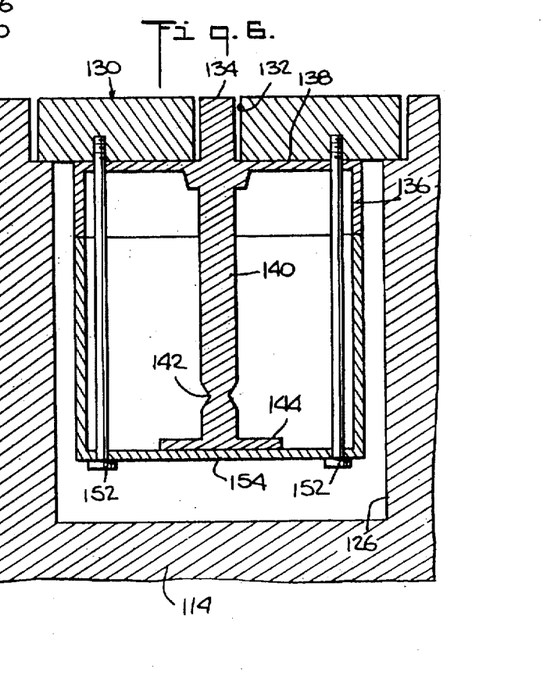
FIG. 6 is an enlarged, longitudinally taken, cross-sectional view illustrating a retaining member for the microscopic load-sensing unit, and a lateral slot provided in the macroscopic load-sensing unit in which is slidably seated the retaining member.

Referring now to FIGS. 4 through 6, there is illustrated in more detail the component parts of the load-sensing assembly 20. In FIG. 4, there is shown the stationary load-sensing unit 22 which includes a non-depressible element 112 and a depressible element 114 operatively associated with and connected to the non-depressible element 112. In this respect, the depressible element 114 is connected to the non-depressible element 112 via a plurality of deformable tension struts 116 which are generally horizontally disposed, and a plurality of deformable compression struts 118 which are generally vertically disposed. The deformable element 114 seats in a cavity 120 formed in the non-depressible element 112, the cavity 120 being rectangular in configuration and defined by four vertical walls, one of which is broken away for illustrative purposes. The upper surface 122 of the depressible element 114 extends in coplanar relation with the upper surface 124 of the non-depressible element 112, and likewise in coplanar relation with the upper surface of the bed 12.

The upper portion of the depressible element 114 is provided with a generally T-shaped cut-out 126 which extends generally laterally of the bed 12 and communicates with a similarly shaped cut-out 128 formed in each of a pair of opposite walls (one of which is the aforementioned broken-away wall) of the non-depressible element 112. The cut-outs 126 and 128 are adapted to confine a plate or slider 130 (FIG. 6) which can be slidingly adjusted therein laterally relative to the bed 12. The slider 130 is provided with a centrally disposed aperture 132 through which upwardly projects freely a stub 134 of the movable load-sensing unit 24. The upper surface of the stub 134 is substantially coplanar with the upper surface of the slider 130 and with the upper surface 122 of the depressible element 114 of the stationary load-sensing unit 22.

The upper surface of the stub 134 presents a tire-contacting area of, preferably, approximately 0.20 inch, and is depressible relative to a non-depressible ring 136 to which it is connected via four horizontally disposed deformable tension struts 138. Coaxially aligned with the stub 134 is a compression-responsive deformable strut 140 having a flexure-responsive portion of reduced thickness 142 and a base portion 144. A cylindrical pot 146 having a diameter corresponding to the ring 136 and a plurality of apertures 148 which are formed in the bottom 154 thereof and coaxially aligned with corresponding apertures 150 formed in the ring 136, supports the base 144 of the vertically disposed strut 140. The pot 146 together with the ring 136 is secured to the underside of the slider 130 by bolts 152 which project through the aforementioned apertures 148 and 150, respectively.

Accordingly, the so-called movable load-sensing unit 24 projects into the confines of the lower portion of the T-shaped slot 126, and is laterally adjustable relative to the so-called stationary load-sensing unit 22 via shifting of the slider 130 along the slot 126. The movable load-sensing unit 24 may be utilized in cooperation with the stationary load-sensing unit 22, when shifted slightly after repeated passes of the tire 50 thereover, for mapping the entire interfacial contact area between the tire 50 and the load-sensing assembly 20 in successive laterally adjacent strips. This is so because the movable load-sensing unit 24 is adapted to in "pin-point" fashion effect microscopic measurement of an orthogonal (three-dimensional) array of loads exerted thereagainst by the rolling tire 50, namely radial forces, longitudinal traction forces and lateral traction forces. On the other hand, the stationary load-sensing unit 22 is adapted to not only effect measurement on a macroscopic level of the orthongonal forces exerted thereagainst by the rolling tire 50, but is likewise adapted to effect measurement of the moments of the forces exerted thereagainst by the tire 50.

In the case of the stationary load-sensing unit 22, the horizontally disposed struts 116 effect measurement of the tension forces imparted thereto by means of appropriate strain gauges of conventional nature (not shown) which are secured thereto in a conventional manner. Likewise, the vertically disposed struts 118 of the unit 22 effect measurement of the compression loads exerted thereagainst via appropriate conventional strain gauges (not shown). Similarly, the horizontally disposed struts 138 of the movable load-sensing unit 24 effect measurement of the tension forces exerted thereagainst via conventional strain gauges (not shown), and the vertically disposed strut 140 effects measurement of the compression loads exerted thereagainst, the vertical strut 140 being pressed against the bottom 154 of the cylindrical pot 146. The flexure portion 142 of the vertical strut 140 acts to isolate the tension-inducing longitudinal and lateral traction forces exerted by the tire 50 against the stub 134 from the compression loads sensed by the vertical strut 140.

In operation, a tire 50 is mounted upon the axle 98 of the carriage 14. The swivel plate 76 is then adjusted or turned selectively relative to the base plate 74 of the carriage 14 so that the median equatorial plane of the tire 50 is either parallel to the longitudinal axis of the bed 12 (for simulating normal straight driving) or, alternatively, so that the median equatorial plane of the tire 50 is inclined relative to the longitudinal axis of the bed 12 (for simulating "cornering" and skidding of the tire 50.) The motor 100 associated with the axle 98 may either be disengaged from the axle 98 to permit the tire 50 to rotate freely upon the bed 12 or, alternatively, the motor 100 may be engaged with the axle 98 to either drive the latter or alternatively inhibit rotation of the latter to assist in simulating skidding of the tire 50.

When the frame 14 is fully adjusted, the jacks 38 may be actuated for purposes of retracting the piston rods 44, thereby causing the yokes 46 to shift to the left and accelerate the carriage 14 toward the load-sensing assembly 20. The jacks 38 have a sufficient capacity to catapult the carriage 14 up to speeds of 30 miles per hour, the load-sensing assembly 20 being spaced from the initial at-rest position of the carriage 14 by approximately 30–35 feet to insure that the tire 50 and apparatus 10 in general reach a condition of substantially vibrationfree equilibrium when the tire 50 passes over the assembly 20. This will likewise allow the tire stresses at the tire-bed interface to reach equilibrium.

If the pawl 72 is removed from the carriage 14, the latter will not cooperate with the belt-and-pulley assembly 62, and will in a condition of acceleration pass over the load-sensing assembly 20 which in turn will effect measurement of the loads exerted thereagainst. If however the pawl 72 is not removed from the carriage 14, when the latter reaches a speed corresponding to the constant speed of displacement of the belt 68 driven by the pulley 64, the pawl 72 will be engaged by an appropriate one of the ribs 70 of the belt 68 and interlock the carriage 14 with the moving belt 68. The carriage 14 will, thereby, at a constant speed pass over the load-sensing assembly 20 and exert loads thereagainst which will be measured by the stationary load-sensing unit 22 and the movable load-sensing unit 24.

The carriage 14 will then pass beyond the assembly 20 and over the transparent plate 52 beneath which the conventional photographic equipment 54 will photograph the interface between the tire 50 and the transparent plate 52. The carriage 14 will via inertia, when released by the belt 68, continue to move until it engages the yoke 56, whereupon its movement will be arrested. The jack 60 associated with the yoke 56 absorbs the shock transmitted to the yoke 56 and terminates the jolted displacement of the latter.

It will be understood, that on each successive pass of the carriage 14 over the assembly 20, the movable load-sensing unit 24 is selectively shifted relative to the slot 126 in the stationary load-sensing unit 22 by moving the slider 130. The movable load-sensing unit 24, thereby, effects microscopic measurement and mapping of the orthongonal loads exerted thereagainst, whereas the stationary load-sensing unit 22 effects macroscopic measurement of both the forces and moments exerted thereagainst. The proximity-sensing device 102, activated and deactivated by the switches 106 and 108, respectively, transmits intelligence of the location of the carriage 14 relative to and upon the assembly 20 (only when the carriage 14 moves to the left towards the assembly 20) and, thereby, together with its associated digital counter the computer assembly assists in evaluating the nature of the interfacial forces, and the moments resulting therefrom and measured by the stationary load-sensing unit 22.

It will be understood that the foregoing description of a preferred embodiment of the present invention is for

What is claimed is:

1. Apparatus for effecting measurement of forces exerted by a pneumatic tire against a surface along which the tire is rolled at an interface between the tire and surface, said apparatus comprising:
   a. an elongate bed;
   b. carriage means for supporting a pneumatic tire in rolling contact with said bed;
   c. support means shiftably supporting said carriage means for displacement relative to said bed;
   d. shifting means for displacing said carriage means relative to said bed; and
   e. load-sensing means for measuring forces exerted by the tire against said bed, said load-sensing means being disposed relative to said bed at a location over which the tire is adapted to roll when said carriage means is displaced relative to said bed.

2. Apparatus as claimed in claim 1, wherein said load-sensing means includes a movable load-sensing unit adjustably supported for selective placement in any of a plurality of positions generally laterally of said bed.

3. Apparatus as claimed in claim 2, including a stationary load-sensing unit supported along said bed and having a greater load-sensing surface area than that of said movable load-sensing unit.

4. Apparatus as claimed in claim 3, wherein said stationary load-sensing unit includes guide means in which said movable load-sensing unit is shiftably confined.

5. Apparatus as claimed in claim 4, wherein said guide means includes a slot extending laterally of said bed, and a slider plate shiftably supported in said slot, said slider plate having an opening formed therein in which is at least partially confined and exposed said movable load-sensing unit.

6. Apparatus as claimed in claim 5, wherein said stationary and movable load-sensing units each includes a respective depressible element, a respective non-depressible element, and deformable means for connecting each depressible element to its corresponding non-depressible element.

7. Apparatus as claimed in claim 6, wherein each said deformable means includes at least one tension-responsive element and at least one compression-responsive element.

8. Apparatus as claimed in claim 7, including a plurality of tension-responsive elements cooperating both with the first said tension-responsive element and said compression-responsive element for isolating each said depressible element from its corresponding non-depressible element.

9. Apparatus as claimed in claim 8, wherein said slot formed in said stationary load-sensing unit is T-shaped and thereby presents an upper open-top recess and a lower closed-bottom recess, said slider plate being slidingly confined in said upper recess, said non-depressible element of said movable load-sensing unit being affixed to the bottom of said slider plate and projecting into said lower recess.

10. Apparatus as claimed in claim 9, wherein said depressible element of said movable load-sensing unit includes an upper portion which projects from the bottom of said slider plate into said opening in the latter, the compression-responsive element of the latter said unit being supported by the non-depressible element of the latter said unit.

11. Apparatus as claimed in claim 10, wherein said compression-responsive element of said movable load-sensing unit includes a flexing portion of reduced thickness.

12. Apparatus as claimed in claim 6, wherein said depressible and non-depressible elements of said stationary load-sensing unit and said slider plate have respective upper surfaces which are substantially both contiguous and coplanar with one another, said bed having a space provided therein for accommodating said non-depressible element of said stationary load-sensing unit, and an upper surface which is both substantially contiguous and coplanar with the upper surface of the latter said non-depressible element.

13. Apparatus as claimed in claim 12, wherein said bed and the latter said non-depressible element have respective laterally extending edges which confront one another in slightly spaced relation, thereby isolating the latter said non-depressible element from said bed for force measurement.

14. Apparatus as claimed in claim 1, wherein said support means includes a pair of spaced parallel guide rods extending longitudinally along said bed one on each side of the latter, said carriage means including respective sleeves affixed thereto and surrounding respective portions of said rods, said sleeves being slidable relative to said rods and supporting said carriage means in spaced relation above said bed such that a tire mounted on said carriage means remains in rolling contact with said bed.

15. Apparatus as claimed in claim 14, wherein said shifting means includes at least one power cylinder affixed to said bed, a protractable-retractable piston rod operatively associated with said power cylinder, and a yoke affixed to a free end of said piston rod and slidably mounted on said guide rods, said yoke being engageable with said carriage means for effecting displacement and acceleration of the latter when said piston rod is actuated, said yoke being disengageable from said carriage means after the latter is displaced a distance along said bed which is greater than the stroke of said piston rod.

16. Apparatus as claimed in claim 15, including abutment means for arresting movement of said carriage means, said load-sensing means being disposed between said yoke of said shifting means and said abutment means.

17. Apparatus as claimed in claim 16, wherein said abutment means includes a yoke engageable by said carriage means and slidably mounted on said guide rods, at least one piston rod having a free end to which is connected the latter said yoke, and a power cylinder operatively associated with the latter said piston rod and affixed to said bed.

18. Apparatus as claimed in claim 15, wherein said shifting means further includes a pair of pulleys rotatably mounted on said bed, an endless band interconnecting and mounted upon said pulleys, drive means for rotating one of said pulleys to effect a closed path displacement of said band and rotation of the other of said pulleys, and coupling means for clamping said carriage means to said band to effect displacement of said carriage means by said band.

19. Apparatus as claimed in claim 18, wherein said coupling means includes a spring-loaded pawl pivotally connected to said carriage means and lockingly engageable with said band after said carriage means is accelerated by said yoke to a speed which corresponds to the closed path displacement speed of said band.

20. Apparatus as claimed in claim 1, including carriage detecting means for sensing the proximity of said carriage means relative to said load-sensing means, said carriage detecting means including a rack affixed to said carriage means, said rack having spaced metallic teeth confronting said bed, and electro-magnetic means affixed to said bed adjacent to said load-sensing means and responsive to each of said rack teeth for effecting magnetically an electronic transmission of pulses whose count defines the position of said carriage means and, thereby, the position of a tire mounted on said carriage means relative to said load-sensing means.

21. Apparatus as claimed in claim 20, including switching means for activating and deactivating said electro-magnetic means, said switching means including a pair of spaced switches mounted on said bed, one such switch on each side of said load-sensing means, and a switch activating member carried by said carriage means and operatively associated with each of said switches for activating the latter.

22. Apparatus as claimed in claim 1, wherein said carriage means includes a frame shiftably mounted on said support means, a bracket having a vertically oriented swivel axis, and means for adjustably securing said bracket in a selected orientation upon said frame and relative to said bed.

23. Apparatus as claimed in claim 22, including means for threadedly adjusting the elevation of said bracket relative to said frame and bed.

24. Apparatus as claimed in claim 1, wherein said bed includes a transparent portion over which the tire mounted on said carriage means is adapted to roll, and means for photographing the interface between the tire and said transparent portion.

25. Apparatus as claimed in claim 1, wherein said bed has a longitudinal extent of approximately 30–35 feet upstream of said load-sensing means to permit the tire to reach a condition of equilibrium.

* * * * *